(12) United States Patent
Truong (10) Patent No.: US 8,223,465 B2
(45) Date of Patent: Jul. 17, 2012

(54) SURGE CURRENT DETECTION IN A SWITCH BY DETECTING CHANGE IN A DUTY CYCLE

(75) Inventor: Tom C. Truong, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 448 days.

(21) Appl. No.: 12/607,918

(22) Filed: Oct. 28, 2009

(65) Prior Publication Data

US 2011/0096445 A1  Apr. 28, 2011

(51) Int. Cl.
*H02H 7/00* (2006.01)
*H02H 9/02* (2006.01)
*H02H 7/10* (2006.01)
*H02H 7/122* (2006.01)

(52) U.S. Cl. ............ 361/18; 361/93.9; 363/50; 363/55; 363/56.03; 363/56.04

(58) Field of Classification Search .................. 361/18, 361/93.9; 363/50, 55, 56.03, 56.04
See application file for complete search history.

(56) References Cited

U.S. PATENT DOCUMENTS

| | | | | |
|---|---|---|---|---|
| 4,034,280 A * | 7/1977 | Cronin et al. | .................. | 363/25 |
| 4,928,200 A * | 5/1990 | Redl et al. | ....................... | 361/94 |
| 7,227,731 B2 * | 6/2007 | Leith et al. | .................... | 361/93.1 |
| 2004/0114398 A1* | 6/2004 | Lipcsei et al. | ................. | 363/41 |
| 2006/0055384 A1* | 3/2006 | Jordan et al. | .................. | 323/282 |
| 2007/0171591 A1* | 7/2007 | Kaya et al. | .................... | 361/100 |
| 2008/0150444 A1* | 6/2008 | Usui et al. | ..................... | 315/219 |
| 2008/0266738 A1* | 10/2008 | Kimber | ........................... | 361/87 |

* cited by examiner

*Primary Examiner* — Jared Fureman
*Assistant Examiner* — Scott Bauer
(74) *Attorney, Agent, or Firm* — William B. Kempler; Wade J. Brady, III; Frederick J. Telecky, Jr.

(57) ABSTRACT

An embodiment of the invention provides a surge current protection circuit. The surge current protection circuit comprises a peak current detector and a current sensing device. When the peak current detector detects when a surge current has occurred, by monitoring a change in duty cycle on a node of a HS (high side) switch, a LS (low side) switch is activated. The current sensing device senses the current drawn through the LS switch. When the current sensing device senses a current that exceeds a current limit, the HS switch is turned off for a period of time such that the surge current is reduced.

20 Claims, 5 Drawing Sheets

SURGE CURRENT DETECTION IN A SWITCH BY DETECTING CHANGE IN A DUTY CYCLE

BACKGROUND

DC (Direct Current)-to-DC converters may be found in many electronic devices. For example, DC-to-DC converters are often found in PDAs (Personal Digital Assistant), cellular phones and laptop computers. These electronic devices often contain several sub-circuits with different voltage level requirements from that supplied by a battery or an external supply. A DC-to-DC converter converts a source of direct current from one voltage level to another voltage level in order to meet the voltage levels required by sub-circuits.

One method of providing DC-to-DC conversion is through the use of a voltage divider. A voltage divider uses two resistors in series to drop a higher voltage to a lower voltage by "dividing" the higher voltage between the two resistors. A voltage divider, however, may dissipate too much power for devices such as laptop computers and cell phones.

Electronic switch-mode DC-to-DC converters convert one DC voltage level to another by storing the input energy temporarily and then releasing that energy to the output at a different voltage. The storage may be in either magnetic field storage components (inductors, transformers) or electric field storage components (capacitors) or a combination of both. This conversion method is more power efficient (often 75% to 98%) than a voltage divider for example. This efficiency is beneficial to increasing the running time of battery operated devices.

The efficiency of electronic switch-mode DC to DC converters has increased due, in part, to the use of power FETs (Field Effect Transistors), which are often able to switch at high frequency more efficiently than other switching devices. One reason that power FETs may increase the efficiency of DC-to-DC conversion is that power FETs can have low "on" resistance. Having low "on" resistance reduces the power lost when power FETs are switching.

Power FETs may be rendered inoperable when too much current is conducted through them. For example, when a power FET starts to charge a discharged capacitor, the instantaneous current or surge current drawn through the power FET can be too great and cause the power FET to stop functioning. Detecting when a power FET is drawing too much current and then turning the power FET off for a period of time can stop the power FET from being rendered inoperable.

DETAILED DESCRIPTION

The drawings and description, in general, disclose a surge protection circuit 702. The surge protection circuit 702 includes a peak current detector 306 and a current sensing device 602. The peak current detector 306 detects when a current surge occurs in a HS (High Side) switch, for example a power NFET (N-type Field Effect Transistor). The surge current is detected by measuring the change in the duty cycle D on an node of the HS switch. When the current surge is detected on the HS switch, a LS (Low Side) switch, for example a power NFET, is turned on. The current sensing device 602 measures the current in the LS switch. When the current measured in the LS switch exceeds a current limit, the HS switch is periodically turned off such that the surge current is reduced.

Figure 1:
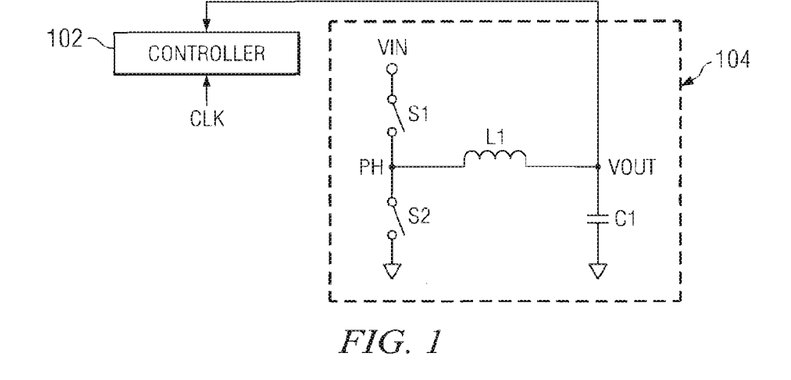
FIG. 1 is a schematic of an embodiment of a step-down synchronous buck converter and a controller.

FIG. 1 is a schematic of an embodiment of a step-down synchronous buck converter 104 and a controller 102. FIG. 1 is included to explain the general principles of a step-down DC-to-DC converter. In this schematic, the frequency at which the switches S1 and S2 switch is controlled by a system clock CLK (shown in FIG. 2). The amount of time, DT, the switch S1 is closed during a clock period T is determined by a duty cycle D (shown in FIG. 2). The duty cycle D may have a value from 0 to 1. The amount of time the switch S2 is closed is (1−D)*T. In this example, the time that both switches S1 and S2 are on at the same time is approximately zero.

The inductor L1 and the capacitor C1 filter out high frequency components created on node PH by switches S1 and S2. By changing the duty cycle D, an approximate DC voltage VOUT may be provided on capacitor C1. For example, the DC voltage VOUT may be increased by increasing the duty cycle D or the DC voltage VOUT may be decreased by decreasing the duty cycle D. In order to maintain the DC voltage VOUT at a steady state value, the DC voltage VOUT is fed back to the controller 102. The controller 102 continually changes the duty cycle D to maintain the DC voltage VOUT at a substantially constant value.

Figure 2:
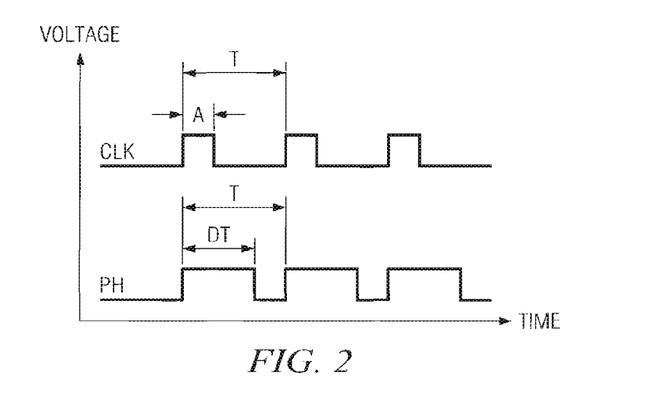
FIG. 2 is a timing diagram for system clock CLK and signal PH.

FIG. 2 is a timing diagram for system clock CLK and signal PH. The system clock CLK has a period T and a duty cycle A. The voltage on node PH has a duty cycle and a period T. In this embodiment, the duty cycle D of node PH is larger than the duty cycle A of the system clock.

Figure 3:
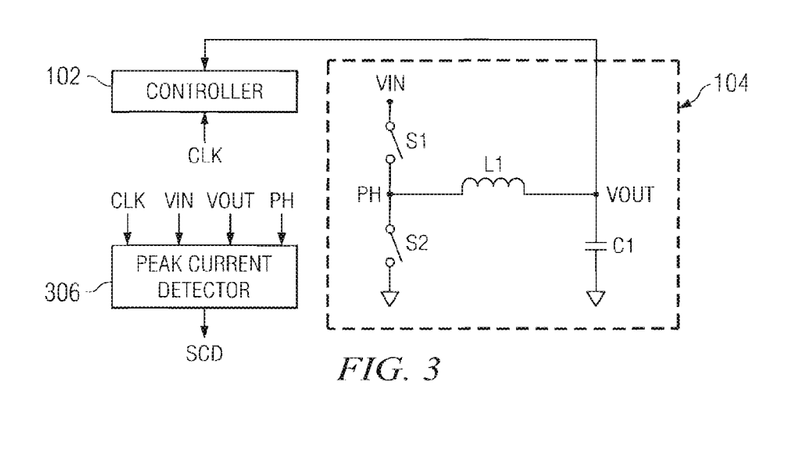
FIG. 3 is a schematic of an embodiment of a step-down synchronous buck converter, a controller and a peak current detector.

FIG. 3 is a schematic of an embodiment of a step-down synchronous buck converter 104, a controller 102 and a peak current detector 306. In this embodiment, the peak current detector 306 detects when a surge current occurs in switch S1. When a surge current is detected in switch S1, the peak current detector 306 outputs a signal SCD (Surge Current Detected). The surge current detector 306 has CLK, VIN, VOUT and PH as inputs. As will be explained later in more detail, the surge current detector 306 monitors change in the duty cycle D of the node PH. The change, in this example, may be expressed as function of VIN and VOUT.

Figure 4:
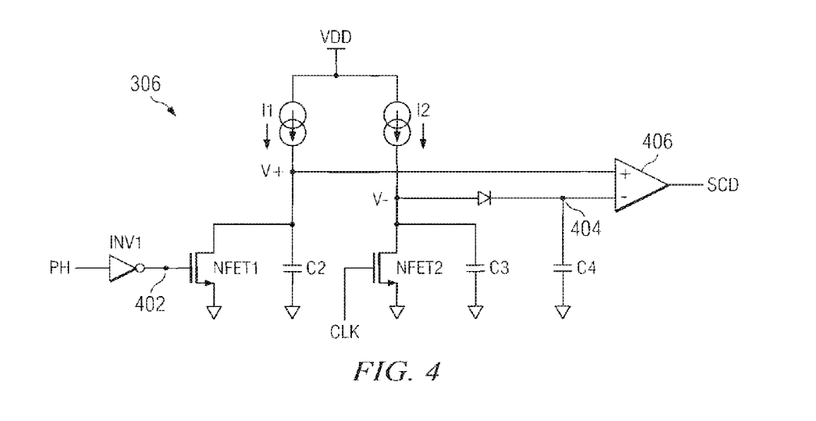
FIG. 4 is an embodiment of a peak current detector.

FIG. 4 is an embodiment of a peak current detector 306. In this embodiment of a peak current detector 306 a current source I1 is connected to node V+. A switch NFET1, in this example an NFET, is also connected to node V+. However, other transistors such as JFETs (Junction Field Effect Transistor) or bi-polar transistors may be used as a switch. The drain of NFET1 is connected to node V+ while the source of NFET1 is connected to GND. The gate of NFET1 is connected to node 402 and the output of inverter INV1 is also connected to the gate of NFET1. The input of the inverter INV1 is connected to node PH. A capacitor C2 is connected to node V+ and GND.

In this embodiment of a peak current detector 306 shown in FIG. 4, a current source I2 is connected to node V−. A switch NFET2, in this example an NFET, is also connected to node V−. However, other transistors such as JFETs (Junction Field Effect Transistor) or bi-polar transistors may be used as a switch. The drain of NFET2 and the anode of diode D1 are connected to node V− while the source of NFET2 is connected to GND. The gate of NFET2 is connected to clock signal CLK A capacitor C3 is connected to node V− and GND.

In this embodiment of a peak current detector 306 shown in FIG. 4, node V+ is connected to an input of a comparator 406. The cathode of diode D1, a connection on capacitor C4 and an input to the comparator 406 are connected at node 404. The output of the comparator 406 is the signal SCD.

Figure 5:
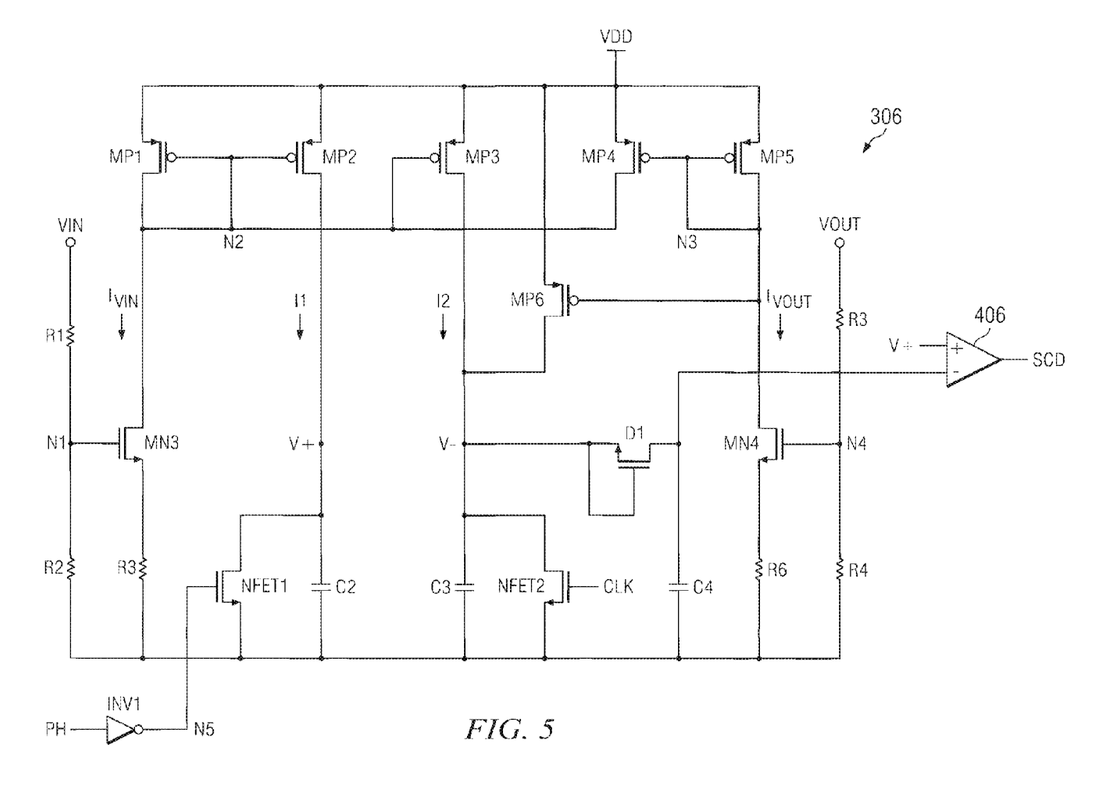
FIG. 5 is a second embodiment of a peak current detector

The current sources I1 and I2 are proportional to VIN and VOUT respectively (this is explained in more detail in FIG. 5). The switches NFET1 and NFET2 are controlled by the voltage on node PH and dock signal CLK respectively. The voltage on node PH is supplied by S1. In one embodiment, the switch S1 may be a power FET. In another embodiment, the switch S1 may be an HS (High Side) power NFET. In one embodiment, the switch S2 may be a power FET. In another embodiment, the switch S2 may be an LS (Low Side) power NFET.

The signals PH and CLK discharge capacitors C2 and C3 respectively. In order for the output SCD of the comparator 406 to switch from a low logical value to a high logical value in this example, the duty cycle D of node PH must be long enough to ramp the voltage of node V+ (positive input of the comparator 406) above the voltage of node V− (negative input of the comparator 406). The diode D1 allows current to flow in one direction, from node V− to node 404. When the voltage on capacitor C3 is greater than the voltage on capacitor C4, current flows into capacitor C4 and into comparator 406. If the voltage on C4 is greater than the voltage on the capacitor C3, the diode D1 prevents current from flowing into C3. This preserves the voltage reference on capacitor C4 when capacitor C3 is discharge by NFET2. Capacitor C3 also acts as a charge storage device and noise filter.

Equations (1)-(3) define a steady state condition for an embodiment of the peak current detector 306. These equations are listed below:

$$V+=(I1*D*T)/C2 \quad (1)$$

$$V-=(I2*T)/C3 \quad (2)$$

$$V->V+ \text{ (steady state condition)} \quad (3)$$

During a steady state condition, current loading in the step-down synchronous buck converter 104 is substantially constant. Because current loading in the step-down synchronous buck converter 104 is substantially constant, the duty cycle D remains substantially constant. The peak voltage on C2 is less than the peak voltage on C3 and as a result the comparator 406 output SCD remains a logical low value. Equations (1) and (2) define the ramp voltage peak on C2 and C3 respectively. The voltage ramp on V+ is generated by I1 charging capacitor C2. The voltage ramp on V− is generated by I2 charging capacitor C3.

Equations (4)-(10) define the conditions when a current surge is detected for an embodiment of the peak current detector 306. These equations are listed below:

$$V+=I1*(D+\Delta D)*T/C2 \quad (4)$$

$$V+=V- \quad (5)$$

$$C=C2=4*C3 \quad (6)$$

$$I1*(D+\Delta D)*T/C=I2*T/40 \quad (7)$$

$$I1=(VIN-VOUT)/R \quad (8)$$

$$I2=(VIN+VOUT)/R \quad (9)$$

$$D+\Delta D=[(VIN+VOUT)/4*(VIN-VOUT)] \quad (10)$$

During a surge condition, the controller 102 will increase the duty cycle and increase the time that the switch S1 is on. Equation (4) defines the peak voltage on node V+. During a surge condition, the peak voltage on node V+ is higher than the peak voltage on node V−. Equation (5) defines the condition when the output SCD of the comparator 406 outputs a logical high value. Equation (6) defines the relationship between capacitor C2 and capacitor C3. In this embodiment, the relationship between capacitor C2 and C3 is that capacitor C2 has approximately 4 times a much capacitance as capacitor C4. This relationship was chosen to detect a specific current surge level in switch S1. However, in different embodiments of the invention, the ratio of capacitors C2 and C3 may be changed to detect a different surge current level in switch S1.

Equation (7) expresses the voltages V+ and V− as function of I1, I2 and the capacitance C. Equations (8) and (9) are expressions of I1 and I2 as a function of VOUT, VIN and R, where R is a resistance seen by VOUT and VIN. Equations (8) and (9) are substituted for I1 and I2 in equation (7) giving equation (10). Equation (10) defines the condition for the comparator 406 to detect a current based on the change AD in duty cycle D.

Equation (10) may be used to determine the change AD in duty cycle D. For example, when VIN=10V, VOUT=2.5V and D=0.25, $\Delta D$=0.167. The surge current $\Delta I$ that causes the output SCD of comparator 406 to switch to a logical high level may be determined using the change in duty cycle $\Delta D$ The surge current is determined as follows:

$$\Delta I=(VIN-VOUT)*(D+\Delta D)*T/L1 \quad (11)$$

In this example, (VIN−VOUT)=7.5 volts, (D+$\Delta D$)=0.417, T=1 usec and L1=3 uh, the surge current $\Delta I$ is 1.04 amperes. In this example, the output SCD of the comparator 406 will change to a high logic level when the surge current $\Delta I$ is 1.04 amperes.

FIG. 5 is a second embodiment of a peak current detector 306. In this second embodiment of a peak current detector 306, the current I1 is equal to approximately (Ivin−Ivout) and the current I2 is equal to approximately (Ivin+Ivout). Ivin is proportional to VIN/(R1+R2) and Ivout is proportional to VOUT/(R3+R4). The voltage at node N1 provides the bias for the gate of MN3 and R5. The voltage at node N4 provides the bias for the gate of MN4 and R6. MP1 provides the current source for Ivin and MP5 provides the current source for Ivout. Since voltage on R3 is based on VIN and resistor divider of R1 and R2, then Ivin is proportional to VIN. When a zero or low Vt (threshold) device is used for MN3, the gate voltage (Vgs) on MN3 is small. As a result, the current Ivin more closely approximates the current VIN/(R1+R2). When a zero or low Vt (threshold) device is used for MN4, the gate voltage (Vgs)

on MN4 is small. As a result, the current Ivout more closely approximates the current VOUT/(R3+R4).

MP1 and MP4 provide the sourcing current for I1. The current source I1 is "mirrored" by MP2 to provide a current for charging capacitor C2. MP3 and MP6 provide the sourcing current for I2. The current source I2 provides current for charging capacitor C3.

The signals PH and CLK discharge capacitors C2 and C3 respectively. In order for the output SCD of the comparator 406 to switch from a low logical value to a high logical value in this example, the duty cycle D of node PH must be long enough to ramp the voltage of node V+ (positive input of the comparator 406) above the voltage of node V− (negative input of the comparator 406). The diode D1 allows current to flow in one direction, from node V− to node 404. When the voltage on capacitor C3 is greater than the voltage on capacitor C4, current flows into capacitor C4 and into comparator 406. If the voltage on C4 is greater than the voltage on the capacitor C3, the diode D1 prevents current from flowing into C3. This preserves the voltage reference on capacitor C4 when capacitor C3 is discharge by NFET2. Capacitor C3 also acts as a charge storage device and noise filter.

Figure 6:
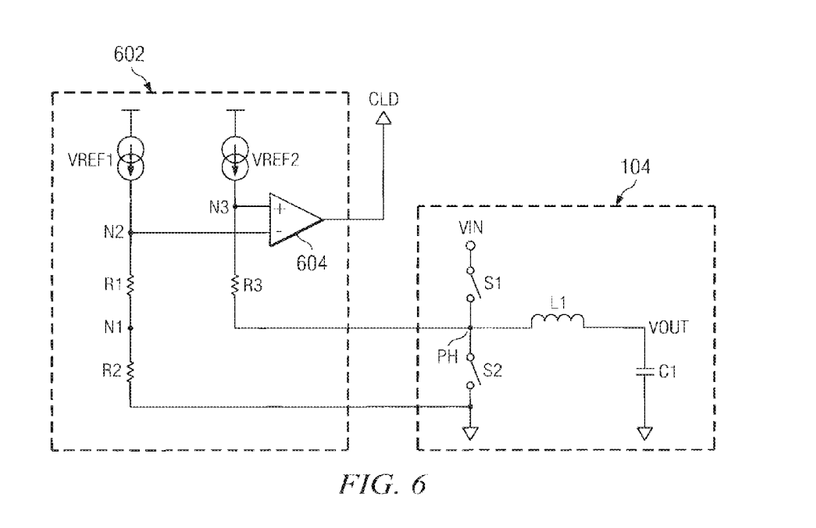
FIG. 6 is an embodiment of a current sensing device and a step-down synchronous buck converter.

FIG. 6 is an embodiment of a current sensing device 602 and a step-down synchronous buck converter 104. In this embodiment, current reference VREF1, resistor R1 and resistor R2 set a voltage reference for the comparator 604. When current I3 flows through closed switch S2 from GND to node PH, the voltage drop on the switch S2 causes the node PH to go to a negative voltage potential. When node N3 is at a lower voltage than node N2, the output CLD of the comparator changes to a high logical level to indicate that an over-current condition has occurred. The output CLD may be used in conjunction with peak current detector 306 to decrease the time that switch S1 is closed during a surge current. As will be explained in more detail, decreasing the time that switch S1 is closed reduces the strength of a peak current through switch S1.

Figure 7:
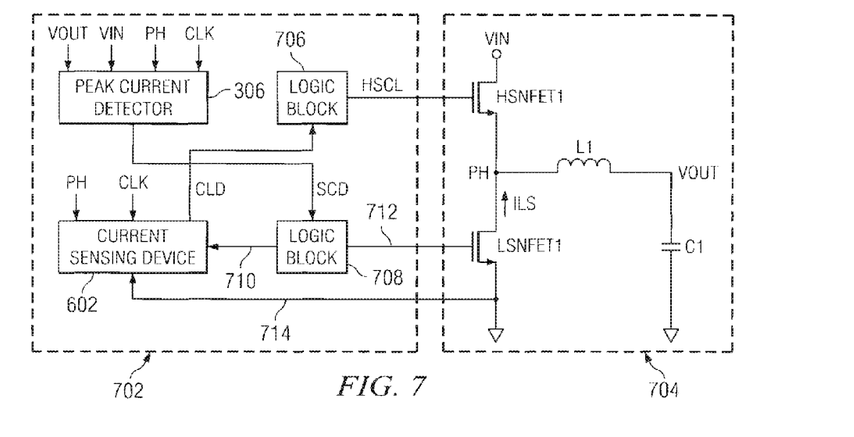
FIG. 7 is an embodiment of a surge protection circuit.

FIG. 7 is an embodiment of a surge protection circuit 702. A peak current detector 306 detects when a surge current occurs in a high side (HS) NFET HSNFET1 by monitoring a change in the duty cycle D on node PH. When the peak detector 306 detects a surge current, a signal SOD is sent to logic block 708. When logic block 708 receives signal SOD, logic block 708 activates low side (LS) NFET LSNFET1 and activates the current sensing device 602 to begin sensing current ILS through the LS NFET LSNFET1.

When the current sensing device 602 in this embodiment of a surge protection device 702 detects that a current limit has been exceeded in the LS switch S2, a signal CLD is sent to the logic block 706. After receiving the signal CLD, the logic block 706 turns the HS NFET HSNFET1 off for at least the period T of a clock cycle. When the logic block 706 does not receive the signal CLD, the HS NFET HSNFET1 switches at duty cycle D.

Figure 8:
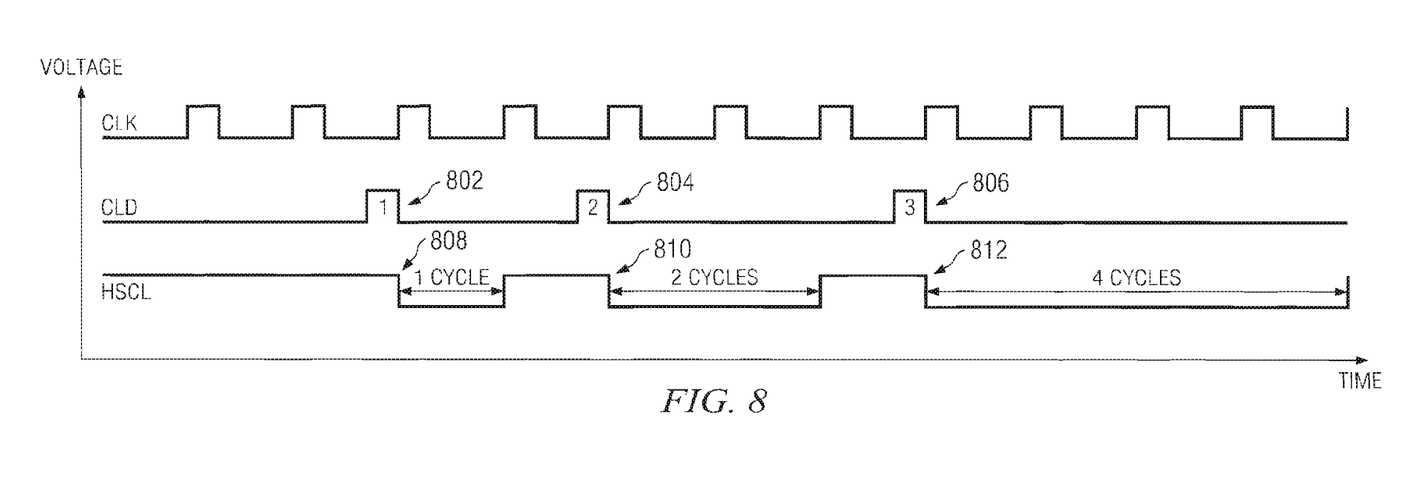
FIG. 8 is a timing diagram for system clock CLK, signal CLD, and signal HSCL.

FIG. 8 is a timing diagram for system clock CLK, signal CLD, and signal HSCL. Signal CLD is the signal that indicates a current limit has been detected in LS NFET LSNFET1. Signal HSCL is the signal that stops the HS NFET HSNFET1 from turning on. The time that signal HSCL is low is increased in binary steps for each consecutive CLD signal received. For example, when a first CLD signal 802 is detected, the signal HSCL 808 is low for one cycle. When a second consecutive CLD signal 804 is detected, the signal HSCL 810 is low for two cycles. When a third consecutive CLD signal 806 is detected, the signal HSCL 812 is low for four cycles. However, when no CLD signal 806 is detected in a following cycle, the HSCL signal 808 goes high and remains high until a CLD signal 806 is detected again. When a CLD signal 806 is detected again, the HSCL signal 808 goes low for one cycle. The time that the HSCL signal 806 goes low is increased in binary steps for each CLD signal 806 detected in a following signal.

Figure 9:
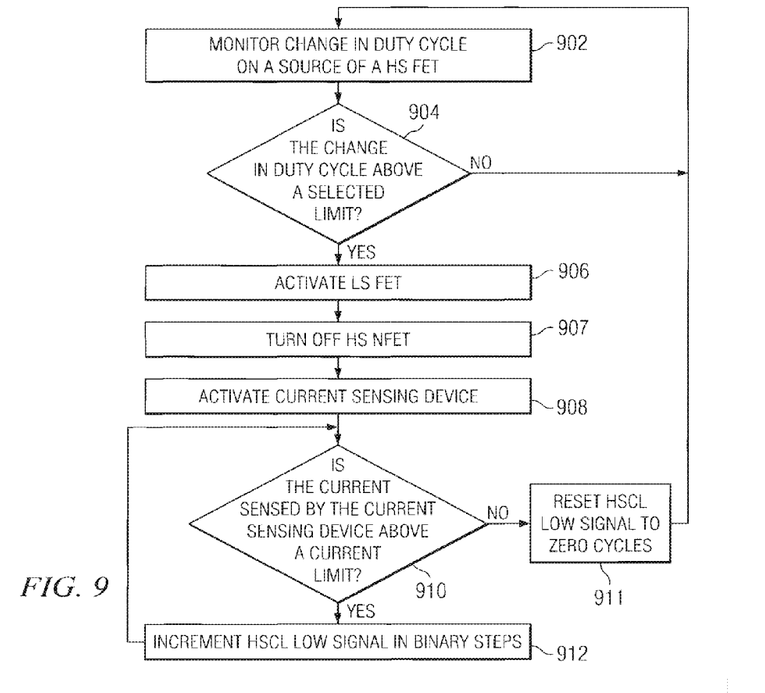
FIG. 9 is a flow chart illustrating an embodiment of a method for detecting a surge Current in a switch.

FIG. 9 is a flow chart illustrating an embodiment of a method for detecting a surge current in a HS NFET. In box 902, a peak current detector 306 monitors the change in duty cycle on the source of the HS NFET. Box 904 determines whether the change in duty cycle is above a selected limit. When the change in duty cycle is above the selected limit, a LS NFET is activated to draw current. After the LS NFET is activated to draw current, the current sensing device 602 is activated. When the current sensed by the current sensing device 602 is above a specified current limit, the HS NFET is turned off for a period of time. The period of time that the NS NFET is turned off is dependent on the time that the HSCL signal 806 is low. For example, when the HSCL signal 806 is low for one cycle, the HS NFET will be turned off for one cycle.

When the HS NFET is turned off for a period of time, current through the LS NET is sensed. When the current sensed by the current sensing device 602 is below the specified limit, the change in duty cycle on the source of HS NFET is monitored again.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A surge protection circuit comprising:
   a peak current detector;
   a current sensing device;
   wherein the peak current detector detects when a surge current has occurred by monitoring a change in a first duty cycle on a first node of a HS (High Side) switch;
   wherein a LS (Low Side) switch is activated when the surge current occurs;
   wherein the current sensing device begins to sense current through the LS switch when the surge current occurs;
   wherein the HS switch is turned off for period of time when the current sensed in the LS switch exceeds a current limit.

2. The surge protection circuit of claim 1 wherein the peak current detector comprises:
   a first current source having a first current I1 proportional to a voltage VIN, wherein the voltage VIN is connected to a second node of the HS switch;
   a second current source having a second current I2 proportional to a voltage VOUT;
   a comparator having a first input, a second input and an output;
   wherein a third current I3 is approximately equal to the first current I1 minus the second current I2;
   wherein a fourth current I4 is approximately equal to the first current I1 plus the second current I2;
   wherein a first voltage V+ on the first input of the comparator is approximately equal to the third current I3 times a first quantity divided by a first capacitance C1, wherein the first quantity is approximately equal to the change in the duty cycle plus the duty cycle;

wherein a second voltage V− on the second input of the comparator is approximately equal to the fourth current I4 times a period T of a signal on the first node of the HS (High Side) switch divided by a second capacitance C2;

such that when the voltage V+ is equal to or greater than the voltage V−, the output of the comparator indicates that a surge current has occurred in the HS switch.

3. The surge protection circuit of claim 1 wherein the peak current detector comprises:

a first current source having a first current proportional to a voltage VIN divided by the sum of a first and second resistor, wherein the voltage VIN is connected to a second node of the HS switch;

wherein the first node of the HS switch is connected to a first connection of an inductor and a first node of the LS switch;

a second current source having a second current proportional to a voltage VOUT divided by the sum of a third and four resistor, wherein the voltage VOUT is connected to a second connection of the inductor and a first connection of a first capacitor;

wherein the second node of the LS switch and a second connection of the first capacitor are connected to GND;

a first switch having an input, a first node and a second node;

a second switch having an input, a first node and a second node;

a first capacitor having a first connection and a second connection;

a second capacitor having a first connection and a second connection;

a third capacitor having a first connection and a second connection;

a diode having a cathode and an anode;

a first comparator having a first input, a second input and an output;

wherein a third current equal to the first current minus the second current is connected to the first connection of the first capacitor, the first node of the first switch and the first input of the comparator;

wherein a fourth current equal to the first current plus the second current is connected to the first connection of the second capacitor, the first node of the second switch and the anode of the diode;

wherein the cathode of the diode is connected to the first connection of the third capacitor and the second input of the first comparator;

wherein the input of the first switch is connected to a first connection of an inverter;

wherein the first node of the HS NFET is connected to a second connection of an inverter;

wherein the input of the second switch is connected to a clock with a second duty cycle and a period T;

wherein the first duty cycle is longer than the second duty cycle;

wherein a change in the first duty cycle changes a first voltage on the first input of the comparator such that the first voltage is higher than a second voltage on the second input of the first comparator;

wherein the output of the first comparator is activated indicating a surge current is detected.

4. The surge protection circuit of claim 1 wherein the current sensing device comprises:

a first current source having an input and an output;

a second current source having an input and an output;

a first resistor having a first connection and a second connection;

a second resistor having a first connection and a second connection;

a third resistor having a first connection and a second connection;

a comparator having a first input; a second input and an output;

wherein the inputs of the first and second current sources are connected to VDD;

wherein the output of the first current source is connected to the first connection of the first resistor and the second input of the comparator;

wherein the output of the second current source is connected to the first input of the comparator and the first input of the third resistor;

wherein the second connection of the first resistor is connected to the first connection of the second resistor;

wherein the second connection of the second resistor is connected to a source of the LS switch;

wherein the second connection of the third resistor is connected to a source of the HS switch;

wherein the output of the comparator is activated when the current sensed in the LS switch exceeds the current limit.

5. The surge protection circuit of claim 3 wherein the peak current detector further comprises:

a first PFET having a gate, a drain and a source;
a second PFET having a gate, a drain and a source;
a third PFET having a gate, a drain and a source;
a fourth PFET having a gate, a drain and a source;
a fifth PFET having a gate, a drain and a source;
a sixth PFET having a gate, a drain and a source;
a first NFET having a gate, a drain and a source;
a second NFET having a gate, a drain and a source;
a fifth resistor connected to the source of the third NFET and GND;
a sixth resistor connected to the source of the fourth NFET and GND;
wherein the first resistor is connected to VIN and the second resistor;
wherein the third resistor is connected to VOUT and the fourth resistor;
wherein the second, fourth, fifth, and sixth resistors are connected to GND;
wherein the sources of the first, second, third, fourth, fifth and sixth PFETs are connected to VDD;
wherein the drain and gate of the first PFET, the drain of the first NFET, the gate of the second PFET, the gate of the third PEET and the drain of the fourth PFET are connected;
wherein the drain of the second PFET is connected to the first NODE of the first switch;
wherein the drain of the third PFET and the drain of the sixth PFET are connected to the first node of the second switch;
wherein the gate of the fourth PFET, the gate of sixth PFET, the gate and drain of the fifth PFET and the drain of the second NFET are connected;
such that the third current is conducted into the first connection of the first capacitor;
such that the fourth current is conducted into the first connection of the second capacitor.

6. The peak current detector of claim 2 wherein the ratio of the capacitance value of the first capacitor C1 to the capacitance value of the second capacitor C2 may be changed to change a limit when a surge current is detected.

7. The surge protection circuit of claim 1 wherein the period of time that the HS switch is off is approximately doubled with each consecutive detection of a surge current.

8. The peak current detector of claim 3 wherein the HS switch; the LS switch, the first switch and the second switch are selected from a group consisting of MOSFETs, JFETs and bipolar transistors.

9. The peak current detector of claim 5 wherein the resistive value of the fifth resistor is approximately equal to the resistive value of the sixth resistor.

10. The peak current detector of claim 5 wherein the first and second NFETs have a threshold voltage Vt of approximately zero.

11. A peak current detector comprising:
a first current source having a first current proportional to a voltage VIN;
a second current source having a second current proportional to a voltage VOUT;
a third current approximately equal to the first current minus the second current;
a fourth current approximately equal to the first current plus the second current;
a first switch;
a second switch;
a first capacitor;
a second capacitor;
a third capacitor;
a diode;
a comparator;
wherein the third current charges the first capacitor;
wherein the first switch discharges the first capacitor as function of a first duty cycle on a HS (high side) power switch;
wherein the fourth current charges the second capacitor;
wherein the second switch discharges the second capacitor as function of a duty cycle of a clock;
wherein the diode and the third capacitor filter high frequency signals;
wherein a change in the first duty cycle changes a first voltage on a first input of the comparator such that when the first voltage on the first input of the comparator is higher than a second voltage on a second input of the comparator, an output of the comparator indicates a surge current is detected.

12. The peak current detector of claim 11 wherein the first switch has an input, a first node and a second node;
wherein the first capacitor has a first connection and a second connection;
wherein the second switch has an input, a first node and a second node;
wherein the second capacitor has a first connection and a second connection;
wherein the third capacitor has a first connection and a second connection;
wherein the diode has a cathode and an anode;
wherein the voltage VIN is connected to a first node of the HS power switch;
wherein the voltage VOUT is connected to a first connection of an inductor and to a first connection of a fourth capacitor;
wherein a second node of the HS power switch is connected to a first node of a LS (Low Side) power switch and to a second connection of the inductor;
wherein a second connection of the fourth capacitor and a second NODE of the LS power switch are connected to a ground;
wherein the cathode of the diode is connected to the first connection of the third capacitor and the second input of the comparator;
wherein the input of the first switch is connected to a first connection of an inverter;
wherein the second node of the HS switch is connected to a second connection of the inverter;
wherein the input of the second switch is connected to the clock with a duty cycle and a period T;
wherein the first duty cycle is longer than the duty cycle of the clock.

13. The peak current detector of claim 12 further comprising:
a first PFET having a gate, a drain and a source;
a second PFET having a gate, a drain and a source;
a third PFET having a gate, a drain and a source;
a fourth PFET having a gate, a drain and a source;
a fifth FEET having a gate, a drain and a source;
a sixth PFET having a gate, a drain and a source;
a first NFET having a gate, a drain and a source;
a second NFET having a gate, a drain and a source;
a fifth resistor connected to the source of the third NFET and GND;
a sixth resistor connected to the source of the fourth NFET and GND;
wherein the first resistor is connected to VIN and the second resistor;
wherein the third resistor is connected to VOUT and the fourth resistor;
wherein the second, fourth, fifth, and sixth resistors are connected to GND;
wherein the sources of the first, second; third, fourth; fifth and sixth PFETs are connected to VDD;
wherein the drain and gate of the first PEET; the drain of the first NFET, the gate of the second PFET, the gate of the third PFET and the drain of the fourth PFET are connected;
wherein the drain of the second PFET is connected to the first node of the first switch;
wherein the drain of the third PFET and the drain of the sixth PFET are connected to the first node of the second switch;
wherein the gate of the fourth PEET, the gate of sixth PFET, the gate and drain of the fifth PFET and the drain of the second NFET are connected;
such that the third current is conducted into the first connection of the first capacitor;
such that the fourth current is conducted into the first connection of the second capacitor.

14. The peak current detector of claim 12 wherein the ratio of the capacitance value of the first capacitor to the capacitance value of the second capacitor may be changed to change a time when the output of the first comparator is activated.

15. The peak current detector of claim 12 wherein a capacitance value of the first capacitor is approximately four times greater than the capacitance value of the second capacitor.

16. The peak current detector of claim 13 wherein the resistive value of the fifth resistor is approximately equal to the resistive value of the sixth resistor.

17. The peak current detector of claim 13 wherein the first and second NFETs have a threshold voltage Vt of approximately zero.

18. A method of reducing a surge current through a HS NFET comprising:

detecting when a surge current occurs in the HS NFET by monitoring change in a duty cycle on a source of the HS NFET during each cycle of a clock, the clock having a period of T;

activating an LS NFET when a surge current is detected;

activating a current sensing device when a surge current is detected;

turning off the HS NFET for a period of time when the current through the LS NFET exceeds a specified current limit.

19. The method of reducing a surge current through a HS NFET as in claim 18 wherein the period of time that the HS FET is off is approximately doubled with each consecutive detection of a surge current.

20. The method of reducing a surge current through a HS NFET as in claim 18 wherein the high-side FET is off continuously when surge current is continuously detected.

* * * * *